United States Patent
Kawamura et al.

(10) Patent No.: US 8,098,291 B2
(45) Date of Patent: Jan. 17, 2012

(54) IMAGE PICKUP APPARATUS, CONTROL METHOD, AND CONTROL PROGRAM, AND DATA PROCESSING APPARATUS, METHOD, AND PROGRAM FOR RECORDING A MOVING IMAGE AND A STILL IMAGE

(75) Inventors: Yuji Kawamura, Chiba (JP); Mikiko Yamada, Kanagawa (JP); Yutaka Yoneda, Kanagawa (JP)

(73) Assignee: Sony Corporation, Tokyo (JP)

( * ) Notice: Subject to any disclaimer, the term of this patent is extended or adjusted under 35 U.S.C. 154(b) by 558 days.

(21) Appl. No.: 12/273,239

(22) Filed: Nov. 18, 2008

(65) Prior Publication Data

US 2009/0135265 A1 May 28, 2009

(30) Foreign Application Priority Data

Nov. 22, 2007 (JP) .............................. P2007-302551

(51) Int. Cl.
H04N 5/225 (2006.01)
H04N 5/77 (2006.01)
(52) U.S. Cl. ..................................... 348/220.1; 386/225
(58) Field of Classification Search ............... 348/220.1, 348/221.1; 386/225
See application file for complete search history.

(56) References Cited

U.S. PATENT DOCUMENTS

| | | | | |
|---|---|---|---|---|
| 7,110,027 B2 * | 9/2006 | Wyman | ....................... | 348/220.1 |
| 7,443,423 B2 * | 10/2008 | Yokonuma | ................... | 348/220.1 |
| 7,675,550 B1 * | 3/2010 | Linzer et al. | ................ | 348/220.1 |
| 7,719,572 B2 * | 5/2010 | Tsujimura et al. | ........... | 348/220.1 |
| 2002/0024602 A1 * | 2/2002 | Juen | ................................ | 348/220 |
| 2003/0112340 A1 * | 6/2003 | Okada et al. | ................. | 348/220.1 |
| 2003/0123859 A1 * | 7/2003 | Ikeda | .............................. | 386/120 |
| 2005/0146623 A1 * | 7/2005 | Juen | ............................... | 348/220.1 |
| 2008/0025701 A1 * | 1/2008 | Ikeda | .............................. | 386/120 |
| 2009/0237528 A1 * | 9/2009 | Kawamura et al. | ....... | 348/231.99 |
| 2009/0273684 A1 * | 11/2009 | Sambonsugi | ............... | 348/220.1 |
| 2009/0290035 A1 * | 11/2009 | Hosoda | ...................... | 348/220.1 |
| 2011/0102614 A1 * | 5/2011 | Juen | ............................. | 348/220.1 |

FOREIGN PATENT DOCUMENTS

| | | | |
|---|---|---|---|
| JP | 2002-44531 | | 2/2002 |
| JP | 2004096354 A | * | 3/2004 |
| JP | 2006325148 A | * | 11/2006 |

* cited by examiner

*Primary Examiner* — John Villecco
(74) *Attorney, Agent, or Firm* — Finnegan, Henderson, Farabow, Garrett & Dunner, L.L.P.

(57) ABSTRACT

An image pickup apparatus performing moving-image data processing and still-image data processing in parallel includes an image pickup unit converting a ray into an electric signal and outputting an image pickup signal, a buffer unit temporarily storing the image pickup signal, a buffer controller controlling reading from the buffer unit, a first signal processing unit outputting a first transmission request, performing processing on the image pickup signal every frame timing in response to the first transmission request, and outputting moving-image data, and a second signal processing unit outputting a second transmission request, performing processing on the image pickup signal in response to the second transmission request at a predetermined timing, and outputting still-image data. The buffer controller determines whether it is possible that the image pickup signal is read without deteriorating continuity based on a data storage state of the buffer unit and the first and second transmission requests.

27 Claims, 11 Drawing Sheets

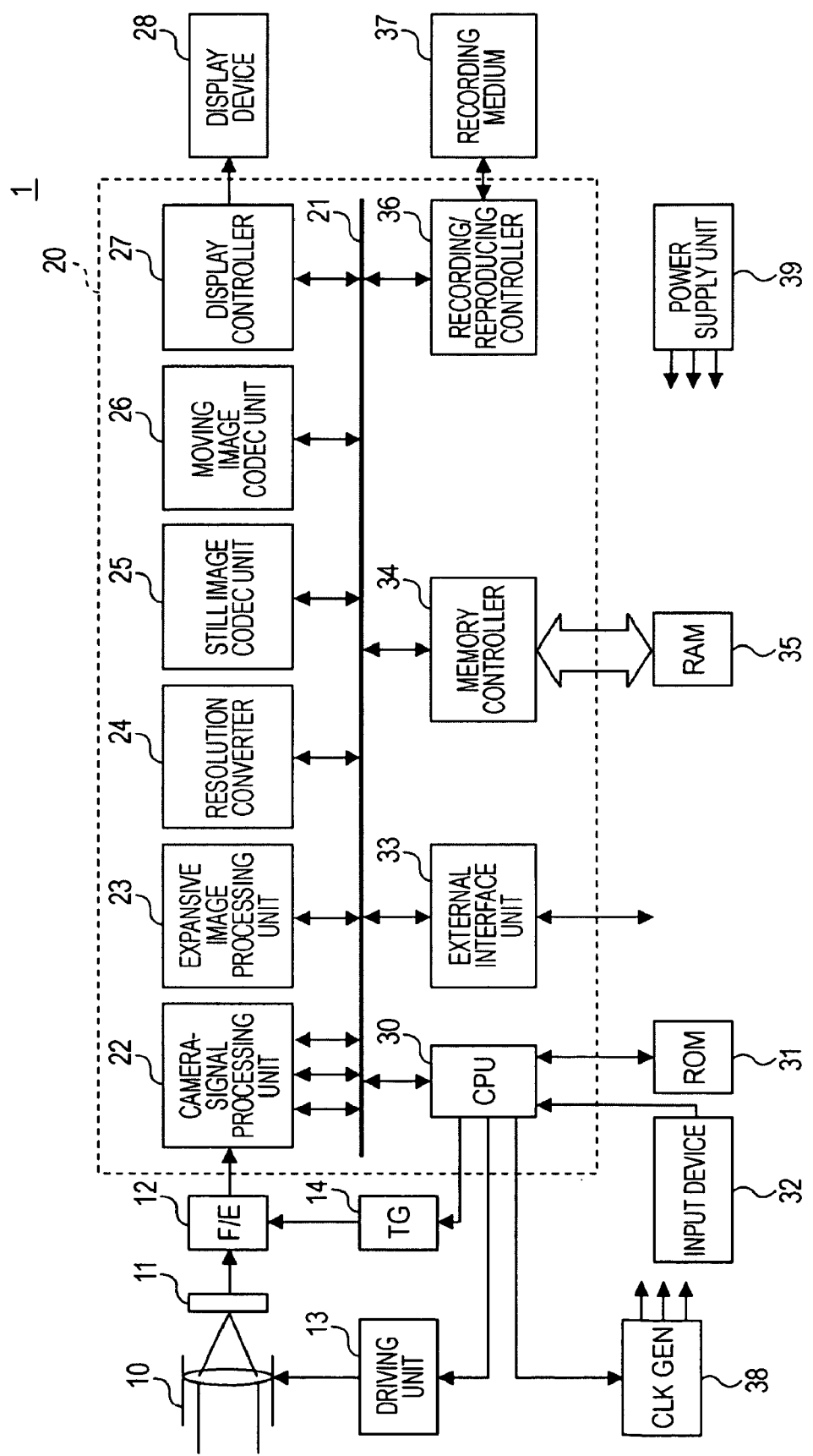

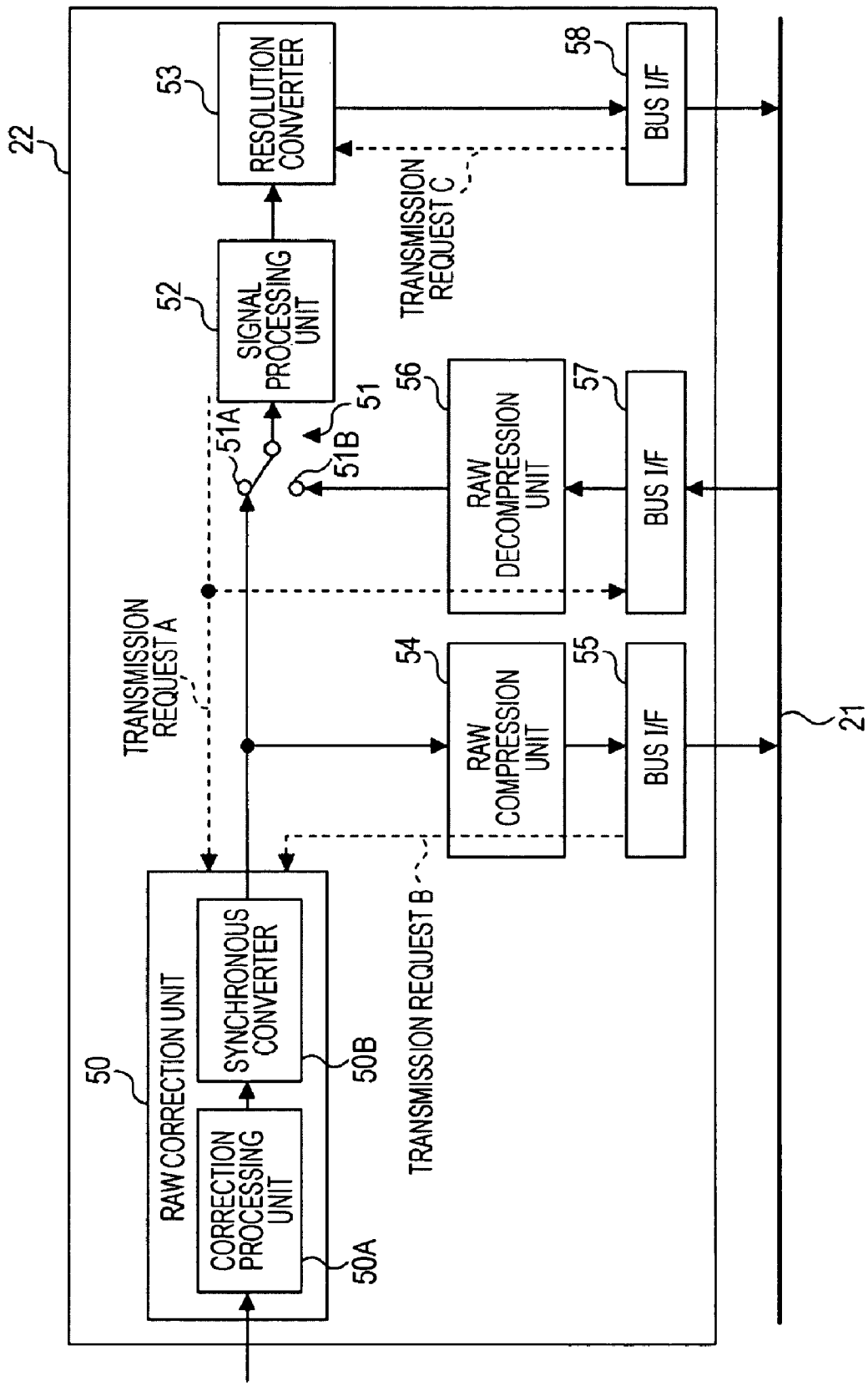

FIG. 6

| RECORDING MODE | TRANSMISSION REQUEST | | STATE | DETERMINATION |
|---|---|---|---|---|
| | A | B | | |
| MOVING-IMAGE RECORDING | O | | BUFFER FULL AND TRANSMISSION REQUEST IS NOT SUPPLIED | BREAKDOWN |
| STILL-IMAGE RECORDING | | O | BUFFER FULL AND TRANSMISSION REQUEST IS NOT SUPPLIED | BREAKDOWN |
| MOVING-IMAGE AND STILL-IMAGE RECORDING | O | O | BUFFER FULL AND TRANSMISSION REQUESTS A AND B ARE NOT SUPPLIED | FULL BREAKDOWN |
| MOVING-IMAGE AND STILL-IMAGE RECORDING | O | O | BUFFER FULL AND TRANSMISSION REQUESTS A OR B IS NOT SUPPLIED | PARTIAL BREAKDOWN |

IMAGE PICKUP APPARATUS, CONTROL METHOD, AND CONTROL PROGRAM, AND DATA PROCESSING APPARATUS, METHOD, AND PROGRAM FOR RECORDING A MOVING IMAGE AND A STILL IMAGE

CROSS REFERENCES TO RELATED APPLICATIONS

The present invention contains subject matter related to Japanese Patent Application JP 2007-302551 filed in the Japanese Patent Office on Nov. 22, 2007, the entire contents of which are incorporated herein by reference.

BACKGROUND OF THE INVENTION

1. Field of the Invention

The present invention relates to an image pickup apparatus capable of recording an moving image and a still image, a method for controlling the image pickup apparatus, a program used to control the image pickup apparatus, a data processing apparatus, a data processing method, and a data processing program. The present invention particularly relates to a configuration in which a still image is recorded while a moving image is recorded.

2. Description of the Related Art

In general, different methods for scanning image pickup elements are employed for different cameras such as digital still cameras which mainly capture still images and digital video cameras which mainly capture moving images so that suitable methods are employed in accordance with types of images to be captured. Such a scanning method considerably affects an entire system. In recent years, digital still cameras include image pickup elements which realize several million pixels or more. In such a digital still camera, in order to record a still image of a high resolution, an image signal obtained by a successive-scanning operation performed every 1/30 minute or more is output from an image pickup element. On the other hand, in an example of general digital video cameras, in order to attain a high resolution of a moving image, a method for obtaining an image signal by interlace scanning performed every 1/60 minute is generally employed.

It is assumed that a moving image and a still image are recorded in parallel using a single image pickup apparatus by appropriately selecting a scanning method of an image pickup element depending on intended usage.

For example, in a system in which quality of a recorded still image is to be emphasized, since a moving image is recorded as images obtained by the successive-scanning operation performed every 1/30 or more, a resolution of the obtained moving image may be low. On the other hand, in a system in which quality of a recorded moving image is to be emphasized, a still image may be obtained from a single moving image when an instruction of recording of a still image is issued (by pressing a shutter button, for example). In this case, since basic image-quality processing including a color-difference correction operation and a gamma correction operation which is mainly suitable for moving images is performed, the processing may not be suitable for still images.

Furthermore, in a case where a function of recording a moving image and a function of recording a still image are intended to be simultaneously realized using a single image pickup element and a processing unit so that a high-quality moving image and a high-quality still image are to be obtained, entire operation of the image pickup element including a scanning method should be changed as usage. Therefore, when an instruction of recording of a still image of a high resolution is issued while a moving image is recorded, an operation of controlling the image pickup element and processing performed on an image pickup signal should be changed. Accordingly, while an operation of obtaining a still image is performed, supply of an image pickup signal which is suitable for a moving image and which is output from the image pickup element is stopped, and therefore, the moving image may be discontinuously recorded in terms of time.

Japanese Unexamined Patent Application Publication No. 2002-44531 discloses a technique of avoiding discontinuity of recording of a moving image which occurs due to recording of a still image. According to this document, a still image of a high resolution can be obtained without deteriorating a resolution and quality of a moving image by outputting an image pickup signal representing a resolution higher than that of the moving image every N-times a cycle of the moving image (N is equal to or larger than 2).

SUMMARY OF THE INVENTION

However, if a signal representing a high resolution for a still image is output every N-times a cycle of a moving image, an image pickup signal which is output in remaining (N−1) frame periods has a resolution for a moving image. Therefore, in the (N−1) frame periods, it is difficult to obtain a still image of a high resolution.

To address this problem, RAW data of a still image may be temporarily stored in a memory while a moving image is recorded, and the RAW data stored in the memory may be subjected to developing processing during a vertical blanking period or a horizontal blanking period.

However, in this method, since processing performed on a moving image and processing performed on a still image should be switched from one to another every several msec or every several dozen msec, it is difficult to perform a reliable operation. In addition, since certain intervals for capturing still images should be ensured, the developing operation performed on the RAW data so that a still image is obtained should be completed within a blanking period which is a fixed time period. In order to realize such a function, a clock frequency should be switched at high speed while the processing is performed on a still image, for example, and therefore, there arises a problem in that a control operation is complicated.

To further address these problems, a path for signal processing may be provided for each of the moving-image processing and the still-image processing so that optimum operation is performed in each of the moving-image processing and the still-image processing and a high-quality image is obtained. In this case, however, there arises a problem in that since two systems of processing functions similar to each other should be provided, cost is increased.

Furthermore, in recent years, digital still cameras and digital video cameras which include additional functions such as a function of processing an HD (High Definition) moving image, a function of recognizing an object, and a function of continuously shooting at ultrahigh speed have been seen. When such an additional function is performed, an amount of shifting between frames should be detected and a determination as to whether a specific pattern is included in a frame should be performed on a large range, and this causes considerable increase in an access band in a frame memory.

Taking a data rate (several dozen MB (Mega Byte)/sec) and the number of pixels, which is over ten millions, of RAW data of a still image into consideration, it is expected that a considerably large memory access band is necessary for performing a function of recording a still image while a moving image is recorded. Therefore, when a system includes a memory which is commonly used when image data is accessed in the additional functions, it may be difficult to ensure the memory access band provided for individual operations of the functions. Therefore, when the memory access band is broken down, all the operations of all the functions may be interrupted.

Accordingly, it is desirable to provide an image pickup apparatus capable of reducing the number of accesses to a memory commonly used by the moving-image processing and the still-image processing when a still image is recorded while a moving image is recorded, and suppressing a breakdown of a memory access band, a method for controlling the image pickup apparatus, a program for controlling the image pickup apparatus, a data processing apparatus, a data processing method, and a data processing program.

According to an embodiment of the present invention, there is provided an image pickup apparatus which performs processing on moving-image data in accordance with an image pickup signal output from an image pickup element in parallel to processing performed on still-image data in accordance with the image pickup signal. The image pickup apparatus includes an image pickup unit configured to convert a ray into an electric signal by means of photoelectric conversion and output a resultant image pickup signal, a buffer unit configured to temporarily store the image pickup signal output from the image pickup unit, a buffer controller configured to control reading of data from the buffer unit, a first signal processing unit configured to output a first transmission request, perform processing on the image pickup signal read from the buffer unit every frame timing in response to the first transmission request, and output moving-image data, and a second signal processing unit configured to output a second transmission request, perform processing on the image pickup signal read from the buffer unit in response to the second transmission request at a predetermined timing, and output still-image data. The buffer controller determines whether it is possible that the image pickup signal is read from the buffer unit without deteriorating continuity on the basis of a data storage state of the buffer unit, the first transmission request, and the second transmission request.

According to another embodiment of the present invention, there is provided a control method for an image pickup apparatus which performs processing on moving-image data in accordance with an image pickup signal output from an image pickup element in parallel to processing performed oh still-image data in accordance with the image pickup signal. The control method for the image pickup apparatus includes the steps of converting a ray into an electric signal by means of photoelectric conversion and temporarily storing an image pickup signal output from an image pickup unit in a buffer unit, controlling reading of data from the buffer unit, outputting a first transmission request, performing processing on the image pickup signal read from the buffer unit every frame timing in response to the first transmission request, and outputting moving-image data, and outputting a second transmission request, performing processing on the image pickup signal read from the buffer unit in response to the second transmission request at a predetermined timing, and outputting still-image data. In the buffer controlling step, it is determined whether it is possible that the image pickup signal is read from the buffer unit without deteriorating continuity on the basis of a data storage state of the buffer unit, the first transmission request, and the second transmission request.

According to still another embodiment of the present invention, there is provided a program which causes a computer to execute a control method for an image pickup apparatus which performs processing on moving-image data in accordance with an image pickup signal output from an image pickup element in parallel to processing performed on still-image data in accordance with the image pickup signal. The control method for the image pickup apparatus includes the steps of converting a ray into an electric signal by means of photoelectric conversion and temporarily storing an image pickup signal output from an image pickup unit in a buffer unit, controlling reading of data from the buffer unit, outputting a first transmission request, performing processing on the image pickup signal read from the buffer unit every frame timing in response to the first transmission request, and outputting moving-image data, and outputting a second transmission request, performing processing on the image pickup signal read from the buffer unit in response to the second transmission request at a predetermined timing, and outputting still-image data. In the buffer controlling step, it is determined whether it is possible that the image pickup signal is read from the buffer unit without deteriorating continuity on the basis of a data storage state of the buffer unit, the first transmission request, and the second transmission request.

According to a further embodiment of the present invention, there is provided a data processing apparatus including a buffer unit configured to temporarily store data input at a predetermined timing, a buffer controller configured to control reading of the data from the buffer unit, a first signal processing unit configured to output a first transmission request, perform first processing on the data read from the buffer unit every predetermined timing in response to the first transmission request, and output first data, and a second signal processing unit configured to output a second transmission request, perform second processing on the data read from the buffer unit in response to the second transmission request, and output second data. The buffer controller determines whether it is possible that the data is read from the buffer unit without deteriorating continuity on the basis of a data storage state of the buffer unit, the first and second transmission requests.

According to a still further embodiment of the present invention, there is provided a data processing method including the steps of controlling reading of data from a buffer unit which temporarily stores data supplied at a predetermined timing, outputting a first transmission request, performing first processing on the data read from the buffer unit every predetermined timing in response to the first transmission request, and outputting first data, and outputting a second transmission request, performing second processing on the data read from the buffer unit in response to the second transmission request, and outputting second data. In the buffer controlling step, it is determined whether it is possible that the data is read from the buffer unit without deteriorating continuity on the, basis of a data storage state of the buffer unit, the first transmission request, and the second transmission request.

According to a yet further embodiment of the present invention, there is provided a data processing program which causes a computer to execute a data processing method. The data processing method includes the steps of controlling reading of data from a buffer unit which temporarily stores data supplied at a predetermined timing, outputting a first transmission request, performing first processing on the data read from the buffer unit every predetermined timing in response to the first transmission request, and outputting first data, and outputting a second transmission request, performing second processing on the data read from the buffer unit in response to the second transmission request, and outputting second data. In the buffer controlling step, it is determined whether it is possible that the data is read from the buffer unit without deteriorating continuity on the basis of a data storage state of the buffer unit and the first and second transmission requests.

As described above, in order to attain parallel processing of the processing performed on the moving-image data in accordance with the image pickup signal output from the image pickup element and the processing performed on the still-image data in accordance with the image pickup signal, a ray is converted into an electric signal by means of photoelectric conversion and the image pickup signal output from an image pickup unit is temporarily stored in a buffer unit. Furthermore, in the first signal processing, the first transmission request is output, and the processing is performed on the image pickup signal read from the buffer unit every frame timing in accordance with the first transmission request so that moving-image data is output. In addition, in the second signal processing, the second transmission request is output, and the processing is performed on the image pickup signal read from the buffer unit at a predetermined timing in accordance with the second transmission request so that still-image data is output. Furthermore, it is determined whether it is possible that the image pickup signal is read from the buffer unit without deteriorating continuity on the basis of a data storage state of the buffer unit, the first transmission request, and the second transmission request. Accordingly, even when an access to the external memory which stores the moving-image data output through the first signal processing and the still-image data output through the second signal processing is not accepted, the moving-image data is controlled to be preferentially output.

As described above, in the first data processing, the first transmission request is output, and the first processing is performed at a predetermined timing on the data read from the buffer unit which temporarily stores data input at a predetermined timing in accordance with the first transmission request so that the first data is output. In addition, in the second data processing, the second transmission request is output, and the second processing is performed on the data read from the buffer unit in accordance with the second transmission request so that the second data is output. Furthermore, it is determined whether it is possible that the data is read from the buffer unit without deteriorating continuity on the basis of a data storage state of the buffer unit, the first transmission request, and the second transmission request. Accordingly, even when an access to the external memory which stores the first data output through the first signal processing and the second data output through the second signal processing is not accepted, the first data is controlled to be preferentially output.

As described above, in order to attain parallel processing of the processing performed on the moving-image data in accordance with the image pickup signal output from the image pickup element and the processing performed on the still-image data in accordance with the image pickup signal, a ray is converted into an electric signal by means of photoelectric conversion and the image pickup signal output from an image pickup unit is temporarily stored in a buffer unit. Furthermore, in the first signal processing, the first transmission request is output, and the processing is performed on the image pickup signal read from the buffer unit every frame timing in accordance with the first transmission request so that moving-image data is output. In addition, in the second signal processing, the second transmission request is output, and the processing is performed on the image pickup signal read from the buffer unit at a predetermined timing in accordance with the second transmission request so that still-image data is output. Furthermore, it is determined whether it is possible that the image pickup signal is read from the buffer unit without deteriorating continuity on the basis of a data storage state of the buffer unit, the first transmission request, and the second transmission request. Accordingly, there is an advantage in that even when an access to the external memory which stores the moving-image data output through the first signal processing and the still-image data output through the second signal processing is not accepted, the moving-image data is controlled to be preferentially output.

As described above, in the first data processing, the first transmission request is output, and the first processing is performed at a predetermined timing on the data read from the buffer unit which temporarily stores data input at a predetermined timing in accordance with the first transmission request so that the first data is output. In addition, in the second data processing, the second transmission request is output, and the second processing is performed on the data read from the buffer unit in accordance with the second transmission request so that the second data is output. Furthermore, it is determined whether it is possible that the data is read from the buffer unit without deteriorating continuity on the basis of a data storage state of the buffer unit, the first transmission request, and the second transmission request. Accordingly, there is an advantage in that even when an access to the external memory which stores the first data output through the first signal processing and the second data output through the second signal processing is not accepted, the first data is controlled to be preferentially output.

BRIEF DESCRIPTION OF THE DRAWINGS

FIG. 1 is a diagram illustrating an example of a configuration of an image pickup apparatus according to a first embodiment of the present invention;

FIG. 2 is a block diagram illustrating an example of a configuration of a camera-signal processing unit;

FIG. 6 is a table listing examples of results of the buffer breakdown determination obtained in accordance with transmission requests;

DESCRIPTION OF THE PREFERRED EMBODIMENTS

Figure 3A:
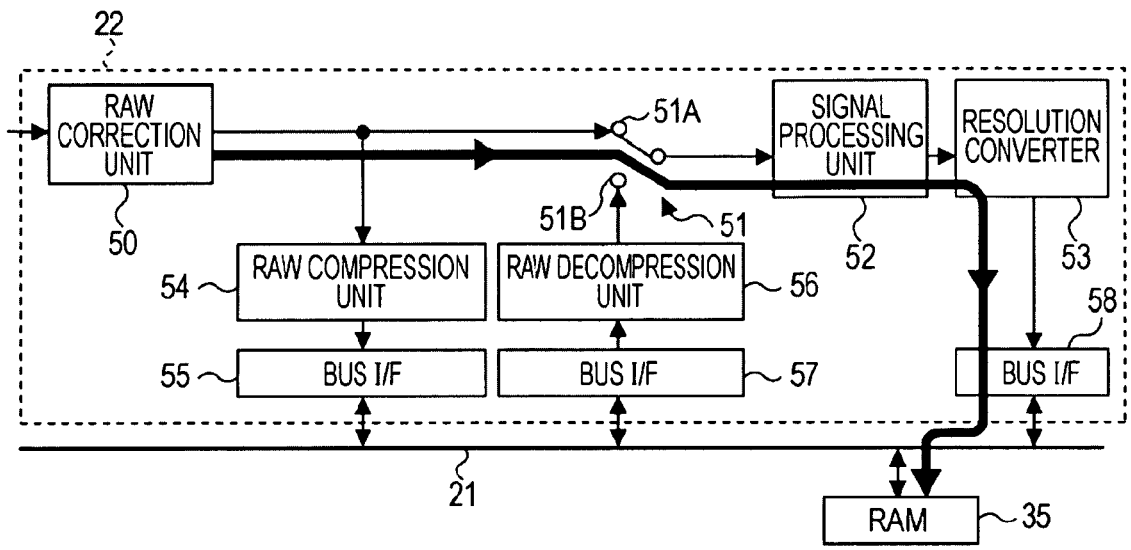
FIGS. 3A to 3C are schematic diagrams illustrating examples of data paths of different operation modes of the camera-signal processing unit.

A first embodiment of the present invention will now be described with reference to the accompanying drawings. FIG. 1 is a diagram illustrating an example of a configuration of an image pickup apparatus 1 according to the first embodiment of the present invention. The image pickup apparatus 1 receives a ray emitted through an optical system 10 using an image pickup element 11, converts the ray into an image pickup signal which is an electric signal, processes the image pickup signal in a signal processing unit 20 additionally using a RAM (Random Access Memory) 35 which is an external memory and which is connected to the signal processing unit 20, and records the processed signal in a recording medium 37. The image pickup apparatus 1 records the image pickup signal in the recording medium 37 not only as moving-image data but also as still-image data corresponding to a still image captured in response to a capturing instruction.

Hereinafter, it is assumed that a matrix of effective pixels of the image pickup element 11 includes 1920 rows and 2560 columns. A frame of a moving image is defined by a matrix of 480 rows and 640 columns which is obtained by resizing the matrix of effective pixels to a quarter size in a vertical direction and a horizontal direction. A frame of a still image is defined by a matrix of 1920 rows and 2560 columns which is the same as the matrix of effective pixels.

The optical system 10 includes a lens system, an aperture mechanism, a focus mechanism, and a zoom mechanism. An aperture operation, a focusing operation, and a zooming operation are controlled using a driving unit 13 under the control of a CPU (Central Processing Unit) 30, which will be described hereinafter, or by a manual operation. A ray emitted from an object is incident on the image pickup element 11 through the optical system 10. The image pickup element 11 including a CCD (Change Coupled Device) sensor converts a received ray into an electric signal by means of photoelectric conversion, and outputs the converted signal as an image pickup signal in line-sequence. Note that the image pickup element 11 is not limited to the CCD sensor, and a CMOS (Complementary Metal-Oxide Semiconductor) imager may be employed.

A front/end (F/E) unit 12 includes a noise suppression unit, an automatic gain controller, and an analog/digital (A/D) converter. When an image pickup signal is supplied from the image pickup element 11 as an analog signal to the F/E unit 12, the noise suppression unit suppresses noise by performing correlated double sampling processing, and the automatic gain controller controls a gain. Then, The A/D converter converts the analog image pickup signal into a digital image pickup signal to be output. The digital image pickup signal corresponds to RAW data including data blocks directly corresponding to pixels of the image pickup element 11.

Note that, in accordance with a timing signal (clock pulse) output from a timing generator 14, which will be described hereinafter, the image pickup element 11 is controlled so as to perform photoelectric conversion every frame timing, for example, to thereby output an image pickup signal, and in addition, the F/E unit 12 is controlled so as to perform processing in synchronization with the frame timing.

The signal processing unit 20 includes processing blocks such as a camera-signal processing unit 22, an expansive image processing unit 23, a resolution converter 24, a still-image codec unit 25, a moving image codec unit 26, a display controller 27, the CPU 30, an external interface (I/F) unit 33, a memory controller 34, and a recording/reproducing controller 36. These processing blocks are connected to one another through a bus 21.

The camera-signal processing unit 22 receives RAW data supplied from the F/E unit 12. The camera-signal processing unit 22 corrects the supplied RAW data by a predetermined method, and converts a clock of a sensor driving system into an internal clock of the signal processing unit 20. The RAW data having the converted clock is converted into data of a format suitable for moving-image processing performed in a later stage.

When a still image is recorded, RAW data is subjected to predetermined encoding and compressing processing and is also supplied to the bus 21. The camera-signal processing unit 22 decodes and decompresses the compressed and encoded RAW data supplied through the bus 21, and converts the RAW data into data of a format suitable for still-image processing performed in a later stage.

Furthermore, the camera-signal processing unit 22 resizes moving-image data or still-image data in a baseband, and converts the moving-image data into data of a resolution (size) which is suitable for moving-image data recording or suitable for output of the image data. In this example, in order to obtain data suitable for the moving-image data recording, data of a resolution of a pixel matrix of 1920 rows and 2560 columns is resized so that data of a resolution of a pixel matrix of 480 rows and 640 columns is obtained. For still-image data recording, conversion of a resolution is not performed here in this example. The moving-image data in the baseband which has been subjected to resolution conversion or the still-image data in the baseband is output from the camera-signal processing unit 22.

The data in a baseband corresponds to data obtained by converting an analog signal into a digital signal, for example, which has not yet been subjected to various operations such as a encoding and compressing operation and a modulating operation. In this example, a digital image pickup signal obtained by converting an analog signal output from the image pickup element 11 into a digital signal using the F/E unit 12 is appropriately referred to as the "data in the baseband".

The expansive image processing unit 23 performs expansive image processing including an object recognition operation and ultrahigh-speed continuous shooting. In the object recognition operation, a face-like portion is extracted from an image utilizing a pattern dictionary which includes patterns obtained by learning in advance. In the ultrahigh-speed continuous shooting, the image pickup element 11 reads a charge and outputs an image pickup signal with a considerably higher frame rate of 240 fps (frame per second), for example, when compared with a frame rate of 60 fps of a general moving-image data. In the ultrahigh-speed continuous shooting, since data should be transmitted at higher speed when compared with transmission of general moving-image data, preferably a processing unit is separately provided.

The resolution converter 24 converts resolutions of moving-image data and still-image data of a baseband into resolutions suitable for displaying the moving-image data and the still-image data in a display device 28, which will be described hereinafter, or suitable for a recording mode.

The still-image codec unit 25 performs compressing/encoding processing on a still-image data of a baseband, and performs decoding/decompressing processing on a still-image data which has been compressed and encoded. Any method may be employed as a method for encoding and compressing a still-image data. For example, a JPEG (Joint Photographic Experts Group) method may be employed. Specifically, the still-image codec unit 25 divides a frame of a supplied still-image data into a plurality of encoded blocks each of which has a pixel matrix of 8 rows and 8 columns, and performs DCT (Discrete Cosine Transform) on each of the encoded blocks. Then, a DCT coefficient obtained through the DCT is quantized by a predetermined quantization scale. The quantized data is compressed by variable length coding such as Huffman coding to be output. The decompressing and decoding processing is performed on an encoded and compressed still-image data by reversely performing the encoding and compressing processing.

The moving-image codec unit 26 performs encoding and compressing processing on moving-image data of a baseband and decompressing and decoding processing on moving-image data which has been encoded and compressed. Any encoding and compressing method may be employed, and for example, an MPEG2 (Moving Pictures Experts Group 2) method, ITU-T (International Telecommunication Union-Telecommunication Standardization Sector) recommendation H.264, ISO (International Organization for Standardization)/IEC (International Electrotechnical Commission) international standard 14496-10 (MPEG-4 part 10), or an advanced video coding (hereinafter simply referred to as "H.246/AVC") method may be employed. Hereinafter, it is assumed that the moving-image codec unit 26 employs the MPEG2 method as the encoding and compressing method.

The moving-image codec unit 26 divides a frame of a supplied moving-image data into a plurality of encoded blocks each of which has a pixel matrix of 8 rows and 8 columns, and performs DCT on each of the encoded blocks. Then, a DCT coefficient obtained through the DCT is quantized by a predetermined quantization scale (hereinafter referred to as "in-frame encoding"). The moving-image codec unit 26 also performs inter-frame encoding by means of predictive encoding utilizing motion-compensating prediction on the supplied moving-image data. The data which has been subjected to the in-frame encoding and the inter-frame encoding is compressed by means of variable length coding such as Huffman coding to be output. The decompressing and decoding processing is performed on an encoded and compressed moving-image data by reversely performing the encoding and compressing processing.

The display controller 27 converts supplied image data into a signal having a format suitable for display in the display device 28. The display device 28 including an LCD (Liquid Crystal Display) is used as a view finder of the image pickup apparatus 1 in addition to a monitor for viewing an image reproduced from the recording medium 37. Furthermore, the display controller 27 generates a display signal used to display text and drawings in the display device 28 in accordance with an instruction issued from the CPU 30, which will be described hereinafter. The display device 28 performs a display operation in response to the display signal. For example, the display device 28 displays a setting screen used to perform various setting of the image pickup apparatus 1, a screen used to display various states of the image pickup apparatus 1, and a cursor.

A ROM (Read Only Memory) 31 and an input device 32 are connected to the CPU 30. The CPU 30 uses a RAM (Random Access Memory) (not shown) as a work memory, and controls entire operation of the image pickup apparatus 1 in accordance with a program stored in the ROM 31 in advance.

For example, the CPU 30 transmits commands to the blocks included in the signal processing unit 20 through the bus 21 and receives data from them so as to control blocks included in the signal processing unit 20. Furthermore, the CPU 30 generates a control signal used to control the focusing operation, the aperture operation, and the zooming operation in accordance with a control signal or an image pickup signal generated in response to an operation of the input device 32, and supplies the generated control signal to the driving unit 13. The driving unit 13 controls units included in the optical system 10 in response to the supplied control signal. The CPU 30 issues a command to the timing generator 14 so that the timing generator 14 outputs a predetermined clock pulse.

In accordance with the command supplied from the CPU 30, the timing generator 14 generates timing signals used to perform processing on the image pickup signal output from the image pickup element 11 such as a frame synchronization signal, a horizontal synchronization signal, or a vertical synchronization signal.

The input device 32 includes various operation devices used to operate the image pickup apparatus 1, and outputs a control signal in accordance with an operation of each of the operation devices. For example, the input device 32 includes a power-supply key used to switch a state of a power supply between an on state and an off state, a mode-switching key used to switch an operation mode of the image pickup apparatus 1 between a shooting mode and a recording mode, for example, and a key used to move the cursor. Furthermore, the input device 32 includes a shutter button used when a still image is captured using the image pickup apparatus 1 and an operation device used to operate the focusing operation, the aperture operation, and the zooming operation of the optical system 10 when a moving image or a still image is captured.

The I/F unit 33 controls transmission and reception of data between the image pickup apparatus 1 and an external device.

The RAM 35 is connected to the memory controller 34. The RAM 35 is an SDRAM (Synchronous Dynamic Random-Access Memory) which operates in synchronization with a memory bus clock, for example, and inputs and outputs data in a unit of a predetermined data length (burst length) by means of burst transmission. The blocks connected to the ROM 31 commonly use the RAM 35. The memory controller 34 controls an access to the RAM 35. When a transmission request is issued to the RAM 35 from one of the processing blocks connected to the bus 21, the transmission request is transmitted from the bus 21 to the memory controller 34, and the memory controller 34 allows an access to the RAM 35 in accordance with the transmission request.

The recording/reproducing controller 36 controls recording of data into the recording medium 37 and controls reproduction of data recorded in the recording medium 37. A detachable nonvolatile memory, or a recordable optical disc may be used as the recording medium 37. Furthermore, a hard disk detachable from or incorporated in the image pickup apparatus 1 may be used as the recording medium 37. Alternatively, a general magnetic tape used to record moving-image data may be used as the recording medium 37.

FIG. 2 is a block diagram illustrating an example of a configuration of the camera-signal processing unit 22. The camera-signal processing unit 22 includes a RAW correction unit 50, a switch unit 51, a signal processing unit 52, a resolution converter 53, a RAW compression unit 54, a RAW decompression unit 56, and bus I/Fs 55, 57, and 58.

Each of the bus I/Fs 55, 57, and 58 includes a buffer memory which temporarily stores data of the RAM 35. When data divided by a unit of a burst length is stored in the buffer memory, each of the bus I/Fs 55, 57, and 58 reads the data in the unit of the burst length from the buffer memory and supplies the read data to the bus 21. Furthermore, each of the bus I/Fs 55, 57, and 58 temporarily stores the data read in the unit of the burst length from the RAM 35 in the buffer memory, and outputs the data at a predetermined timing.

The RAW correction unit 50 includes a correction processing unit 50A and a synchronous converter 50B. The correction processing unit 50A performs various correction processing operations including defect correction performed on supplied RAW data and lens correction, and performs demosaic processing on an arrangement of the RAW data so as to change the data arrangement to data arrangement suitable for correction processing and color conversion processing, which are performed in later stages.

The synchronous converter 50B converts a clock of a sensor driving system into a clock of a system. Specifically, since data supplied to the camera-signal processing unit 22 corresponds to data output from the image pickup element 11, the data is synchronized with a driving clock used when a charge is read from the image pickup element 11. On the other hand, data output from the camera-signal processing unit 22 should be synchronized with an internal clock of the signal processing unit 20. The synchronous converter 50B including a buffer memory writes input data to the buffer memory in accordance with the clock of the sensor driving system, and reads the data from the buffer memory in accordance with the clock of the system. Note that the data is read from the buffer memory in response to a transmission request supplied to the synchronous converter 50B.

In accordance with a transmission request A supplied from the signal processing unit 52, RAW data is read from the buffer memory included in the synchronous converter 50B and is supplied through a terminal 51A, which is one of terminals of the switch unit 51, to the signal processing unit 52. The signal processing unit 52 converts the RAW data into an image signal having a format suitable for processing to be performed in a later stage. For example, the signal processing unit 52 converts the RAW data into an Y/C signal including a brightness signal Y and a color-difference signal Cb/Cr.

The signal processing unit 52 further performs predetermined image-quality correction processing operations such as white-balance processing, gamma-correction processing, and edge-emphasizing processing on the image signal which is obtained by converting the RAW data. Note that, in general, different image qualities should be obtained for a moving image and a still image. Therefore, the signal processing unit 52 switches parameters from one to another, that is, a parameter used when the image-quality correction processing operations are performed on moving-image data and a parameter used when the image-quality correction processing operations are performed on still-image data, under the control of the CPU 30.

The image signal which has been subjected to the signal processing using the signal processing unit 52 is converted so as to have a resolution corresponding to an operation mode, for example, using the resolution converter 53, and is supplied through the bus I/F 58 to the bus 21 in response to a transmission request C supplied through the bus I/F 58.

The transmission request A output from the signal processing unit 52 is also supplied to the bus I/F 57. The bus I/F 57 requests the memory controller 34 to read compressed RAW data stored in the RAM 35, and supplies the compressed RAW data read and transmitted from the RAM 35 to the RAW decompression unit 56 at a predetermined timing in response to the request. The RAW decompression unit 56 performs decompressing and decoding processing by reversely performing an operation performed using the RAW compression unit 54, which will be described hereinafter, so as to decompress and decode the compressed RAW data. Then, a terminal 51B is selected in the switch unit 51 and a signal output from the RAW decompression unit 56 is supplied through the terminal 51B of the switch unit 51 to the signal processing unit 52.

Note that the operations of the signal processing unit 52 and the resolution converter 53 are performed in response to the transmission request C supplied from the bus I/F 58 and a signal transmitted in response to the transmission request A output from the signal processing unit 52. Specifically, the signal processing unit 52 and the resolution converter 53 perform data transmission and signal processing when a data transmission request of an output side and a data-output response of an input side are enabled.

In response to the transmission request B supplied from the bus I/F 55, the RAW data is read from the buffer memory included in the synchronous converter 50B and is supplied to the RAW compression unit 54. The RAW compression unit 54 performs encoding and compressing processing on the supplied RAW data to be output. The RAW compression unit 54 preferably employs an encoding and compressing method which attains reduced deterioration of image quality.

For example, as disclosed in Japanese Unexamined Patent Application Publication No. 2005-311743, a conversion table used to associate data which has not yet been converted with data which is a result of conversion and which has a smaller bit length obtained in accordance with a conversion curve similar to a gamma curve is generated, and the RAW data may be subjected to the encoding and compressing processing after making the data length thereof smaller with reference to the conversion table. Furthermore, in addition to the encoding and compressing processing using the conversion table obtained on the basis of the conversion curve similar to the gamma curve, an encoding and compressing processing employing a DPCM (Differential Pulse Code Modulation) method disclosed in Japanese Unexamined Patent Application Publication No. 2006-352509 may be additionally used. Furthermore, data which has been subjected to the encoding and compressing processing using these methods may be further subjected to encoding and compressing processing using Huffman code, for example.

Note that real time transmission of the RAW data is emphasized in the encoding and compressing processing performed in the RAW compression unit 54. For example, the encoding and compressing processing is performed in line-sequence in accordance with a read characteristic of the image pickup element 11. In addition, the encoding and compressing processing may be performed by providing a line memory capable of storing a plurality of lines in the RAW compression unit 54 and by sequentially scanning still-image data divided into blocks, each of which has a pixel matrix of 8 rows and 8 columns, in a horizontal direction on a block-by-block basis.

The compressed RAW data which has been subjected to the encoding and compressing processing using the RAW compression unit 54 is supplied through the bus I/F 55 to the bus 21.

An example of an operation of the image pickup apparatus 1 having the configuration described above will now be briefly described. In a moving-image data recording mode used when moving-image data is mainly recorded, a ray emitted from an object is incident on the image pickup element 11 through the optical system 10, is converted into an electric signal through photoelectric conversion, and is output as an image pickup signal every frame timing. The image pickup signal is subjected to predetermined processing such as noise suppression processing and gain control processing using the F/E unit 12, and is further subjected to A/C conversion so as to be output as RAW data every each frame timing. The RAW data output from the F/E unit 12 is supplied to the camera-signal processing unit 22 included in the signal processing unit 20.

The RAW data is subjected to correction processing using the correction processing unit 50A included in the camera-signal processing unit 22 and is written in the buffer memory included in the synchronous converter 50B in accordance with the clock of the sensor driving system. In response to a transmission request A output from the signal processing unit 52, the RAW data is read from the buffer memory. Here, the RAW data is read from the buffer memory in accordance with the clock of the system whereby conversion of the clock is performed. The RAW data output from the synchronous converter 50B is supplied to the signal processing unit 52 through the switch unit 51, is converted into moving-image data of a baseband, and is further converted using the resolution converter 53 so as to have a predetermined resolution. The moving-image data is output from the resolution converter 53 in response to a transmission request C, is transmitted to the bus 21 through the bus I/F 58, and is written to the RAM 35.

The moving-image data written in the RAM 35 is read from the RAM 35 and supplied through the bus 21 to the resolution converter 24 and the moving-image codec unit 26. The resolution converter 24 converts a resolution of the supplied moving-image data into a resolution suitable for displaying the moving-image data in the display device 28. The moving-image data in which the resolution thereof is converted using the resolution converter 24 is supplied through the bus 21 to the recording medium 37 so as to be displayed as a recording monitor image in the display device 28.

The moving-image data written to the RAM 35 is also supplied through the bus 21 to the moving-image codec unit 26. The moving-image codec unit 26 performs encoding and compressing processing using an MPEG2 method, for example. The moving-image data which has been compressed is supplied through the bus 21 to the memory controller 34 and stored in the RAM 35. The moving-image data in which the resolution thereof is converted is supplied through the bus 21 to the memory controller 34 and stored in the RAM 35.

Note that the moving-image data written in the RAM 35 may be supplied through the bus 21 to the expansive image processing unit 23 where the predetermined image processing operations are performed, and thereafter, may be supplied to the resolution converter 24. Furthermore, the moving-image data in which the resolution thereof has been converted using the resolution converter 24 may be supplied through the bus 21 to the expansive image processing unit 23 where the image processing is performed.

When a predetermined amount of the compressed moving-image data is stored in the RAM 35, the recording/reproducing controller 36 reads the compressed moving-image data in a unit of recording of the recording medium 37, for example, so that the data is stored in the recording medium 37.

When still-image data is intended to be recorded while the moving-image data is recorded, first, a shutter button provided as the input device 32 is pressed so as to instruct recording of the still-image data while the moving-image data is recorded, for example. In response to the pressing of the shutter button, a control signal is supplied from the input device 32 to the CPU 30. The CPU 30 controls the units included in the image pickup apparatus 1 in accordance with the control signal so that still-image recording is performed.

For example, still-image data is obtained and recorded in accordance with the RAW data obtained at a frame timing immediately after the shutter button is pressed. Specifically, in the camera-signal processing unit 22, the RAW data obtained when the shutter button is pressed is subjected to the predetermined correction processing using the correction processing unit 50A and is written to the buffer memory in accordance with the clock of the sensor driving system using the synchronous converter 50B. The RAW data written to the buffer memory is read in accordance with the clock of the system in response to the transmission request B whereby the clock of the RAW data is converted, and the RAW data is supplied to the RAW compression unit 54. The RAW data is subjected to the compressing and encoding processing using the RAW compression unit 54. Then, the compressed RAW data is transmitted through the bus I/F 55 to the bus 21, and further transmitted through the memory controller 34 so as to be stored in the RAM 35.

The compressed RAW data stored in the RAM 35 is read from the RAM 35 at a predetermined timing and supplied to the camera-signal processing unit 22. The compressed RAW data supplied to the camera-signal processing unit 22 is supplied through the bus I/F 57 to the RAW decompression unit 56 in response to a transmission request A so as to be subjected to decompressing and decoding processing. The decompressed RAW data is converted into still-image data of a baseband using the signal processing unit 52, is subjected to resolution conversion using the resolution converter 53, is transmitted through the bus I/F 58 to the bus 21, and is written to the RAM 35 through the memory controller 34.

The RAW data written in the RAM 35 is read in a predetermined manner, is supplied through the bus 21 to the still-image codec unit 25, and is subjected to encoding and compressing processing in accordance with a JPEG method. The compressed still-image data is supplied through the bus 21 to the recording/reproducing controller 36, and is recorded in the recording medium 37 while moving-image data is not recorded. The compressed still-image data may be temporarily stored in the RAM 35, read from the RAM 35 while moving-image data is not recorded in the recording medium 37, and recorded in the recording medium 37.

Note that when the still-image data is recorded while moving-image data is recorded, the encoding and compressing processing performed on the RAW data using the camera-signal processing unit 22 and the processing of writing the compressed RAW data to the RAM 35 should be carried out in synchronization with an output of the image pickup element 11 in real time so that the recording of the moving image is not interrupted.

On the other hand, the processing of reading the compressed RAW data stored in the RAM 35, the decompressing processing and the signal processing performed on the read RAW data using the camera-signal processing unit 22, the compressing end encoding processing using the still-image codec unit 25, and the processing of supplying the compressed still-image data to the recording/reproducing controller 36 are performed during a blanking period of a driving signal of the image pickup element 11, that is, at a timing in which the bus 21 is not in a congestion state. Note that since it is not necessary to perform the signal processing on the still-image data in real time, the signal processing is performed at low speed by utilizing software processing performed by the CPU 30 and by a general DSP (Digital Signal Processor).

Figure 3B:
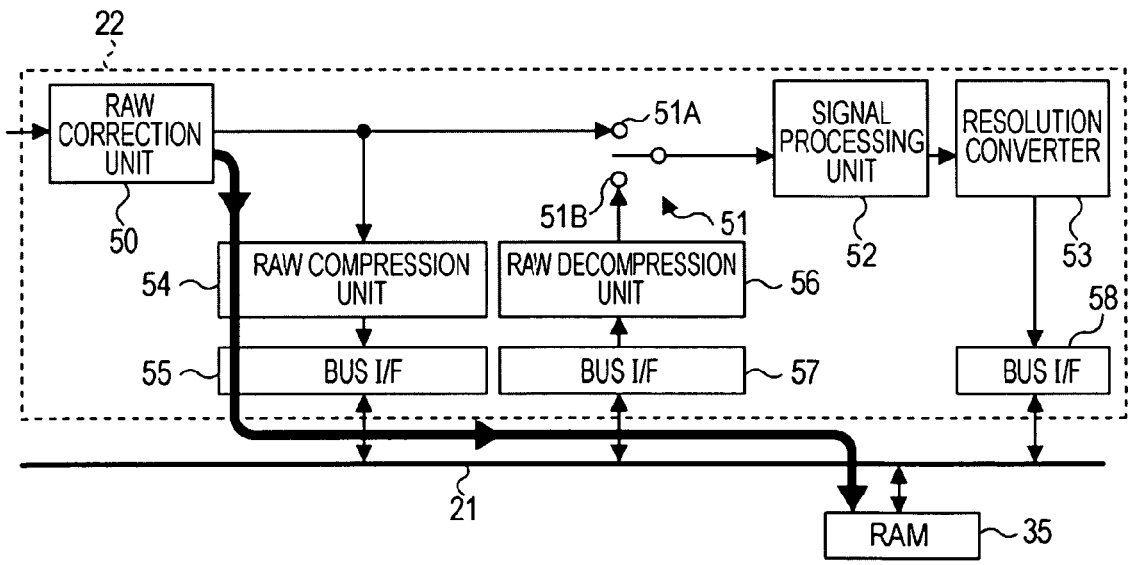
Figure 3C:
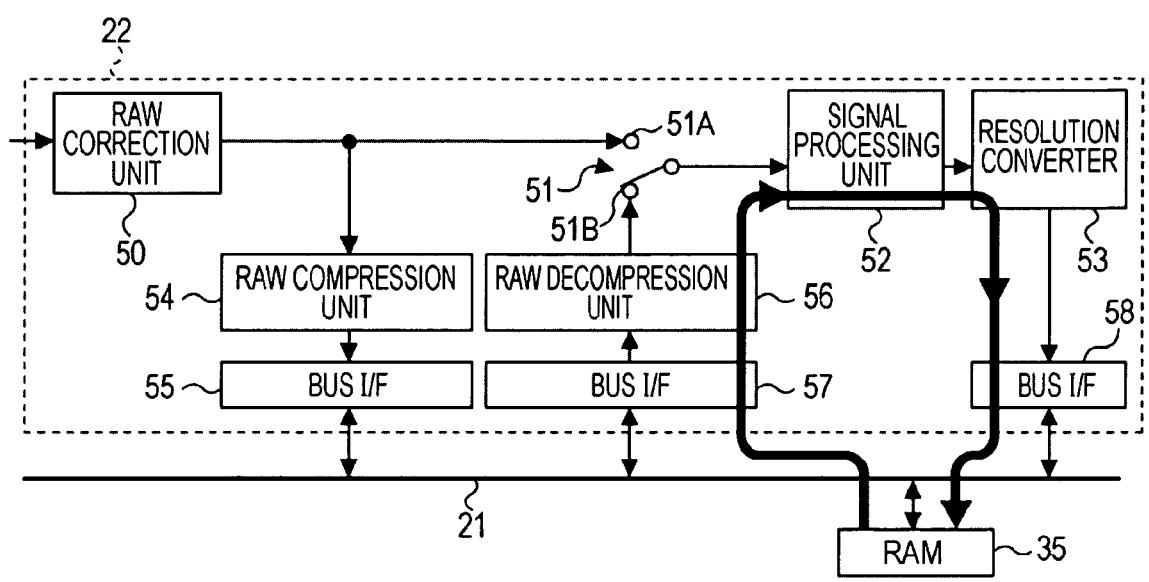

Next, processing performed using the camera-signal processing unit 22 will be described. FIGS. 3A to 3C are schematic diagrams illustrating examples of data paths of different operation modes of the camera-signal processing unit 22. Note that the memory controller 34 is omitted in FIGS. 3A to 3C. FIG. 3A shows an example of a data path in a moving-image data recording mode. In the moving-image data recording mode, processing performed on RAW data serving as moving-image data which is supplied from the image pickup element 11 through the F/E unit 12 to the camera-signal processing unit 22 and monitoring processing of displaying the moving-image data in the display device 28 are performed. In the moving-image data recording mode, these processing operations are performed every frame timing.

In the moving-image data recording mode, the terminal 51A is selected in the switch unit 51, and RAW data output from the RAW correction unit 50 every frame timing, for example, is supplied through the switch unit 51 to the signal processing unit 52 and further to the resolution converter 53 in response to a transmission request A supplied from the signal processing unit 52 as denoted by a heavy line in FIG. 3A. The data is output from the resolution converter 53 in response to a transmission request C supplied from the bus I/F 58, is supplied through the bus I/F 58 to the bus 21, and is written to the RAM 35. The data written to the RAM 35 is supplied through the bus 21 to the moving-image codec unit 26 and the display controller 27 in later stages.

In the moving-image data recording mode, the processing performed using the RAW correction unit 50 to the processing of writing the data to the RAM 35 should be performed in real time. Note that a term "real-time processing" means processing performed without deteriorating time continuity of data. Specifically, in a case of moving-image data, the real-time processing is determined to be successfully performed when data transmission and data processing operations of the units are performed without deteriorating continuity of frames.

FIGS. 3B and 3C are examples of data paths in a still-image data recording mode. In the still-image data recording mode, different data paths are employed, that is, a data path used for reading an image pickup signal from the image pickup element 11 and a data path used when signal processing is performed on RAW data obtained by converting an image pickup signal.

FIG. 3B shows an example of a data path used for reading an image pickup signal. In this case, as denoted by a heavy line in FIG. 3B, RAW data is output from the RAW correction unit 50 in response to a transmission request B supplied from the bus I/F 55, is subjected to the predetermined encoding and compressing processing using the RAW compression unit 54, and is supplied to the bus I/F 55. The resultant compressed RAW data is further transmitted from the bus I/F 55 to the bus 21 and is written to the RAM 35.

FIG. 3C shows an example of a data path used when signal processing is performed on the compressed RAW data written to the RAM 35. The compressed RAW data written to the RAM 35 is read in a predetermined method. The compressed RAW data read from the RAM 35 is supplied through the bus 21 and the bus I/F 57 to the RAW decompression unit 56, and is further supplied through the selected terminal 51B of the switch unit 51 to the signal processing unit 52. The RAW data is subjected to the predetermined signal processing using the signal processing unit 52 and the resolution converter 53, is output from the resolution converter 53 in response to a transmission request C supplied from the bus I/F 58, and is again written to the RAM 35 through the bus I/F 58 and bus 21. The RAW data written to the RAM 35 is supplied through the bus 21 to the still-image codec unit 25 in a later stage.

Since it is not necessary that the processing performed on still-image data is carried out in real time, the processing of reading the compressed RAW data from the RAM 35 may be performed when access bands of the bus 21 and the RAM 35 have margins, for example.

Next, the processing performed using the camera-signal processing unit 22 will be described in detail hereinafter. As described above, the synchronous converter 50B temporarily stores RAW data input in synchronization with the clock of the sensor driving system in the buffer memory, and the RAW data is read from the buffer memory in synchronization with the clock of the system, whereby conversion of the clock is performed. The buffer memory at least has capacity capable of converting the clock and absorbing instantaneous access delay which occurs in the bus 21. When writing to the buffer memory is performed although reading from a buffer memory has not been performed, overflow occurs in the buffer memory, and therefore, a buffer function is broken down.

An example of a case where such a breakdown of the buffer is generated due to a difference between a reading speed of RAW data read from the buffer memory and a writing speed of the RAW data written to the buffer memory includes a case where an amount of data transmission increases in the bus 21 to which compressed RAW data is supplied, and therefore, the bus 21 is in a congestion state. For example, when the bus 21 is in a congestion state due to transmission of data which has a priority higher than that of the compression RAW data, the bus I/F 55 does not perform processing of transmitting the compressed RAW data to the bus 21 until the transmission of the data having the higher priority is completed. Alternatively, the bus I/F 55 controls the RAW compression unit 54 to stop the compressing processing performed on the RAW data, and waits until the transmission of the data having the higher priority is completed and the buffer memory becomes empty.

Furthermore, in a case where the RAW compression unit 54 performs the encoding and compressing processing on RAW data using variable length coding in which a compression rate varies in accordance with a space frequency component of the RAW data, when the RAW data which is to be subjected to the encoding and compressing processing has many high-frequency components, an amount of the data which has been subjected to the encoding and compressing processing may become large. In this case also, the buffer may be broken down.

When it is possible that the buffer is broken down, in order to continuously record still-image data, the encoding and compressing processing performed on RAW data and the operations in the preceding stage should be stopped until the memory buffer becomes empty. The operations in the preceding stage includes the operation of outputting the image pickup signal from the image pickup element 11, the operation of outputting the RAW data from the F/E unit 12, and the correction processing performed using the correction processing unit 50A. However, when still-image data is recorded while moving-image data is recorded, the preceding processing may not be stopped since the moving-image data should be continuously recorded.

Figure 4:
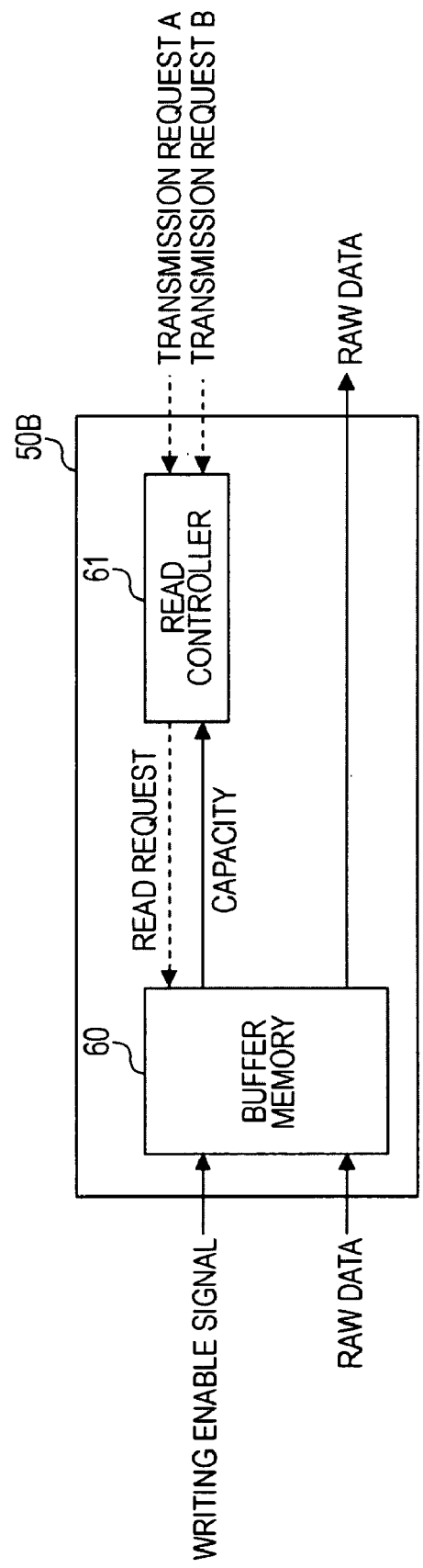
FIG. 4 is a block diagram illustrating an example of a configuration of a synchronous converter.

Therefore, when the synchronous converter 50B monitors a state of the buffer memory and detects the breakdown of the buffer, breakdown processing is performed. FIG. 4 is a block diagram illustrating an example of a configuration of the synchronous converter 50B which performs such breakdown processing. The synchronous converter 50B includes a buffer memory 60 and a read controller 61. The buffer memory 60 employs FIFO (First In First Out) control and performs writing of data in response to a writing enable signal supplied from a preceding processing side. The read controller 61 supplies a data reading request to the buffer memory 60 in accordance with transmission requests A and B, and the state of the capacity of the buffer memory 60. The state of the capacity of the buffer memory 60 may be indicated by one of a full state and an empty state.

When the capacity of the buffer memory 60 is not in an empty state, and the transmission requests A and B are received, the read controller 61 makes a read request to be transmitted to the buffer memory 60 active, reads data from the buffer memory 60, and supplies the data to the signal processing unit 52 and the RAW compression unit 54.

Here, the read controller 61 determines whether it is possible that the buffer is broken down in accordance with the state of the capacity of the buffer memory 60, and the transmission requests A and B. Specifically, it is determined that the buffer is broken down when the capacity of the buffer memory 60 is in the full state and one of the transmission requests A and B is not received. Note that a determination as to whether one of the transmission requests A and B is received is performed in accordance with a result of a determination as to whether the one of the transmission requests A and B has been transmitted to the read controller 61 at a timing in which processing to be performed in response to the one of the transmission requests A and B is carried out.

Figure 5:
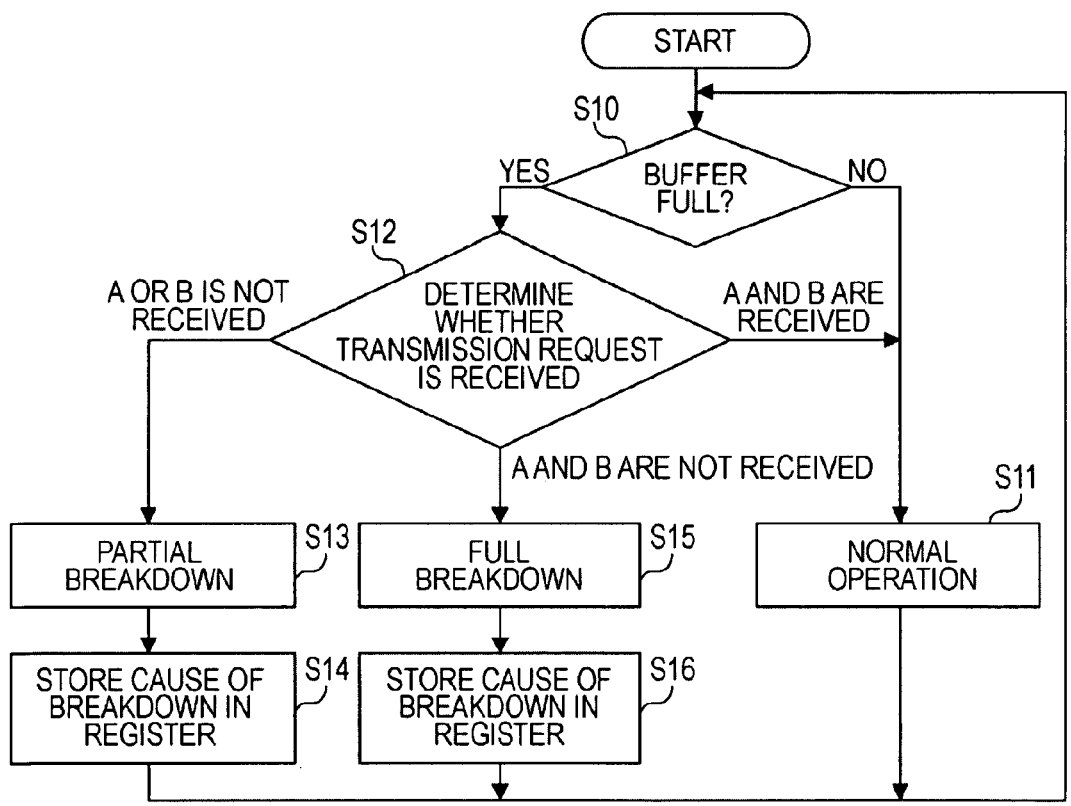
FIG. 5 is a flowchart illustrating an example of buffer breakdown determination processing.

FIG. 5 is a flowchart illustrating an example of buffer breakdown determination processing. In step S10, it is determined whether the buffer memory 60 is in the full state. When the determination is negative in step S10, the process proceeds to step S11 where normal data transmission processing is performed, for example.

On the other hand, when the determination is affirmative in step S10, the process proceeds to step S12 where it is determined whether each of the transmission requests A and B is received. When it is determined that the transmission requests A and B are received, the process proceeds to step S11, where the normal transmission processing is performed.

When it is determined that one of the transmission requests A and B is not received, it is possible that the buffer is broken down. Here, a case where one of the transmission requests A and B is not received is referred to as "partial breakdown" (step S13), and a cause of the partial breakdown is stored in an internal register included in the read controller 61, for example, in step S14. On the other hand, a case where it is determined that both the transmission requests A and B are not received is referred to as "full breakdown" (step S15), and a cause of the full breakdown is stored in the internal register in step S16. The CPU 30 reads the internal register included in the read controller 61 so as to recognize whether the partial breakdown or the full breakdown occurred in a unit of frame processing.

Note that the cause stored in the internal register included in the read controller 61 may correspond to information of a transmission request which has been determined not to be received. For example, when the transmission request A is determined not to be received, and therefore, it is possible that the partial breakdown occurred, information on the transmission request A is stored in the internal register included in the read controller 61. As another example, when both the transmission requests A and B are determined not to be received, and therefore, it is possible that the full breakdown occurred, the information on the transmission request A and information on the transmission request B are stored in the internal register included in the read controller 61.

FIG. 6 is a table listing examples of results of the buffer breakdown determination obtained in accordance with transmission requests A and B. For example, when only moving-image data is recorded, only the transmission request A is supplied to the read controller 61. In a case where the recording mode corresponds to the moving-image data recording mode and the capacity of the buffer memory 60 is in the full state, when the transmission request A is not supplied to the read controller 61, it is determined that it is possible that the buffer is broken down. For example, in a case where the bus 21 is in a congestion state, and therefore, the transmission request C is not output from the bus I/F 58, data which has been subjected to the resolution conversion using the resolution converter 53 is not supplied to the bus 21. In this case, since the signal processing unit 52 may not request the synchronous converter 50B to transmit the next data, the signal processing unit 52 does not output the transmission request A.

For example, when only still-image data is recorded, only the transmission request B is supplied to the read controller 61. In a case where the recording mode corresponds to the still-image data recording mode and the capacity of the buffer memory 60 is in the full state, when the transmission request B is not supplied to the read controller 61, it is determined that it is possible that the buffer is broken down. For example, when the bus 21 is in a congestion state, the bus I/F 55 is prevented from outputting the transmission request B, and in addition, the encoding and compressing processing performed on the RAW data using the RAW compression unit 54 is stopped. When the congestion of the bus is reduced, the transmission request B is output and the encoding and compressing processing performed on the RAW data using the RAW compression unit 54 may be restarted.

Furthermore, for example, when still-image data is recorded while moving-image data is recorded, the transmission requests A and B are supplied to the read controller 61. In a case where the recording mode corresponds to a recording mode which allows the moving-image data and the still-image data to be recorded and the capacity of the buffer memory 60 is in the full state, when one of the transmission requests A and B is not supplied to the read controller 61, it is possible that the buffer is partially broken down whereas when both the transmission requests A and B are not supplied to the read controller 61, it is possible that the buffer is fully broken down.

As described above, in the first embodiment of the present invention, the determination as to whether it is possible that the buffer memory 60 is broken down is made by monitoring the state (a full state and an empty state) of the buffer memory 60 and monitoring the transmission requests A and B using the read controller 61.

For example, if the capacity of the buffer becomes full due to congestion of the bus 21, and therefore, a transmission request on an output side is not supplied at a predetermined timing, the processing does not catch up with a reading rate of the image pickup element 11. Accordingly, it is possible that real-time processing is not ensured in recording of moving-image data, for example. In this case, for example, it is determined that a system error occurred due to the bus 21 or the RAM 35. This determination is performed by monitoring the capacity of the buffer memory 60 and the transmission requests A and B using the read controller 61.

Furthermore, as described above with reference to FIG. 3A, during the recording of moving-image data, the operation of outputting moving-image data used for monitoring to the display device 28, the encoding and compressing processing performed using the moving-image codec unit 26, and object recognition processing performed using the expansive image processing unit 23, for example, are carried out by commonly using the bus 21. Therefore, it is presumed that a band for the bus 21 changes in a unit of frame. For example, when moving-image data is subjected to the encoding and compressing processing in the moving-image codec unit 26 using the MPEG2 method, a compression rate varies depending on a picture in an image, and in addition, a data rate also varies for each frame.

In the entire system, it is difficult to reliably ensure the bus band and the memory access band for recording of moving-image data and recording of still-image data when the still-image data is recorded while the moving-image data is recorded due to some causes including the case in which the data rate varies as time advances. An amount of data transmission per image data in still-image data recording using RAW data may be larger than an amount of data transmission per image data in moving-image data. Therefore, processing should be controlled assuming that the partial breakdown occurs on the still-image data recording side.

Accordingly, when possibility of the partial breakdown in the still-image data recording is detected, a method for preventing occurrence of breakdown in the moving-image data recording is preferably provided.

For example, relief setting for an operation mode which has priority among the operation modes corresponding to the transmission requests A and B is performed on the internal register of the read controller 61 described above. When possibility of partial breakdown is detected in the other operation mode which does not have priority, response operations for data outputs are continuously performed so that data transmission in the operation mode in which the relief setting is performed. In this way, even when possibility of breakdown of the buffer due to a sudden change of the bus band is detected, the operation in the operation mode which has priority is continuously performed.

For example, when priority is intended to be given to the moving-image data recording mode, the relief setting for the transmission request A is performed on the internal register included in the read controller 61. When still-image data is recorded while moving-image data is recorded, and when possibility of breakdown of the buffer is detected in the still-image data recording, a reading operation performed on the buffer memory 60 in accordance with the transmission request B is stopped for a period of one frame, for example, and a reading operation performed on the buffer memory 60 in accordance with the transmission request A is preferentially performed.

A second embodiment of the present invention will now be described. Unlike the system according to the first embodiment, a system in which occurrence of buffer breakdown is suppressed is provided in the second embodiment. Such a system is realized by the following methods. (1) A compression rate of the RAW data is increased using a RAW compression unit 54. (2) Compressing and encoding processing is performed on moving-image data output from a camera-signal processing unit 22 and compressed moving-image data is supplied to a moving-image codec unit 26, for example. (3) A plurality of external memories (RAMs 35) and a plurality of buses 21 are provided.

In the second embodiment of this embodiment, the method (3) is employed, that is, a plurality of external memories (RAMs 35) and a plurality of buses are provided so that possibility of occurrence of buffer breakdown is suppressed. Since use of the method (3) increases a size of hardware, the method (3) has a disadvantage in terms of cost when compared with the method (1), that is, the method for increasing a compression rate of RAW data and the method (2), that is, the method for further performing the encoding and compressing processing on moving-image data. However, the method (3) is considerably superior to the methods (1) and (2) in terms of image quality.

Figure 7:
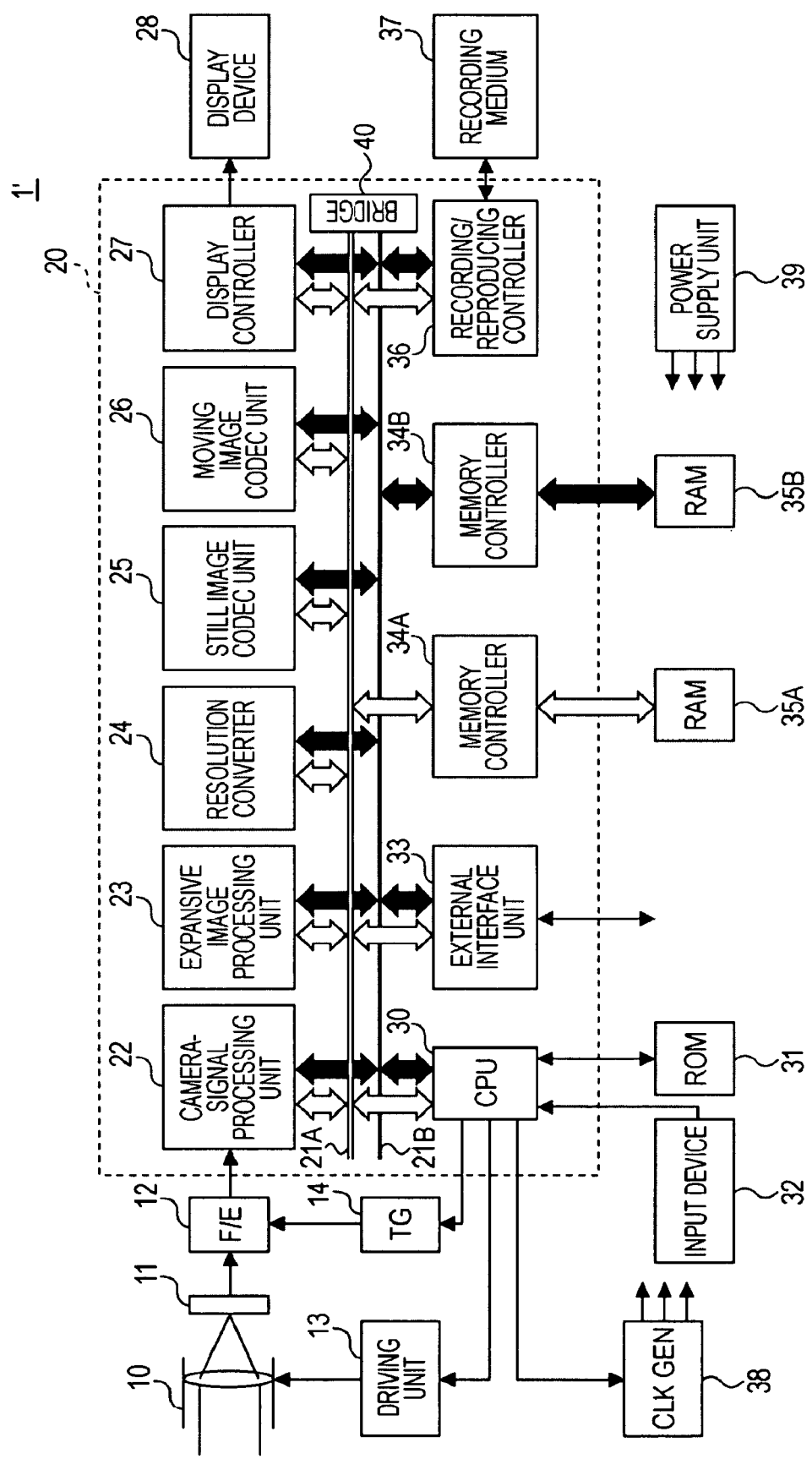
FIG. 7 is a block diagram illustrating an example of a configuration of an image pickup apparatus according to a second embodiment of the present invention.

FIG. 7 is a block diagram illustrating an example of a configuration of an image pickup apparatus 1' according to the second embodiment of the present invention. Note that, in FIG. 7, reference numerals the same as those used in FIG. 1 is assigned to components similar to those shown in FIG. 1, and therefore, detailed descriptions thereof are omitted. The image pickup apparatus 1' of FIG. 7 is different from the image pickup apparatus 1 of FIG. 1 in that two external memories for a signal processing unit 20, i.e., a RAM 35A and a RAM 35B are provided, and two buses, i.e., a bus 21A and a bus 21B which are used when the blocks included in the signal processing unit 20 and a CPU 30 access the RAMs 35A and 35B are provided. Furthermore, it is preferable that a bridge circuit 40 is additionally arranged between the RAMs 35A and 35B for data transmission since a degree of freedom of accessibility to the RAMs 35A and 35B is improved.

A camera-signal processing unit 22, an expansive image processing unit 23, a resolution converter 24, a still-image codec unit 25, a moving-image codec unit 26, and a display controller 27 are connected to the buses 21A and 21B. Similarly, the CPU 30, an external I/F unit 33, and a recording/reproducing controller 36 are connected to the buses 21A and 21B. The RAM 35A is connected through a memory controller 34A to the bus 21A whereas the RAM 35B is connected through a memory controller 34B to the bus 21B. That is, access to the RAM 35 is performed through the bus 21A whereas access to the RAM 36 is performed through the bus 21B.

Figure 8:
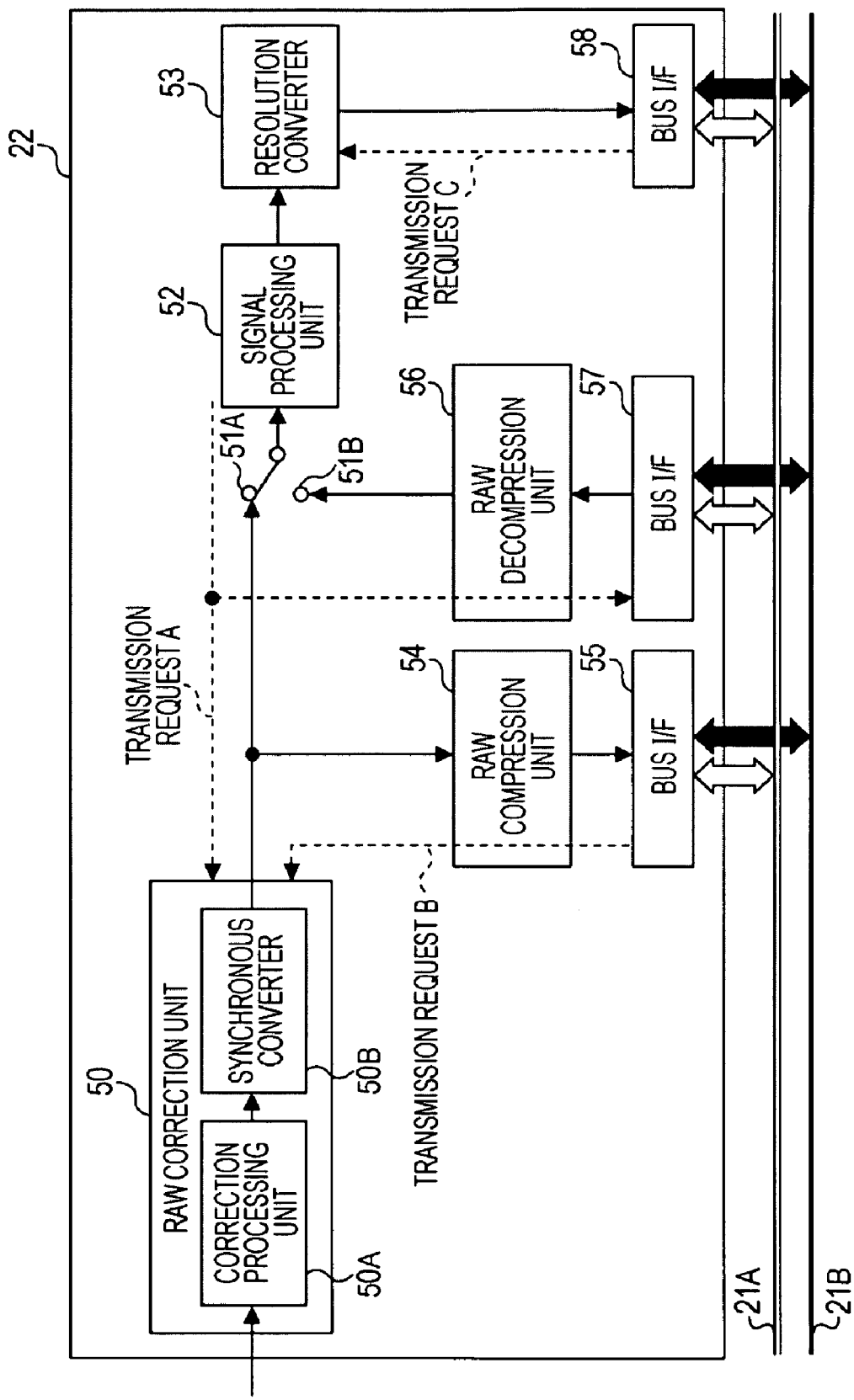
FIG. 8 is a block diagram illustrating an example of a configuration of a camera-signal processing unit according to the second embodiment.

FIG. 8 is a block diagram illustrating an example of a configuration of the camera-signal processing unit 22 according to the second embodiment. In FIG. 8, reference numerals the same as those used in FIG. 2 are assigned to components the same as those shown in FIG. 2, and therefore, detailed descriptions thereof are omitted. In the example of the camera-signal processing unit 22 shown in FIG. 8, each of bus I/Fs 55 and 57 are connected to the buses 21A and 21B. The camera-signal processing unit 22 selects the bus 21A or the bus 21B for bus access in accordance with whether still-image data is processed or moving-image data is processed.

Figure 9A:
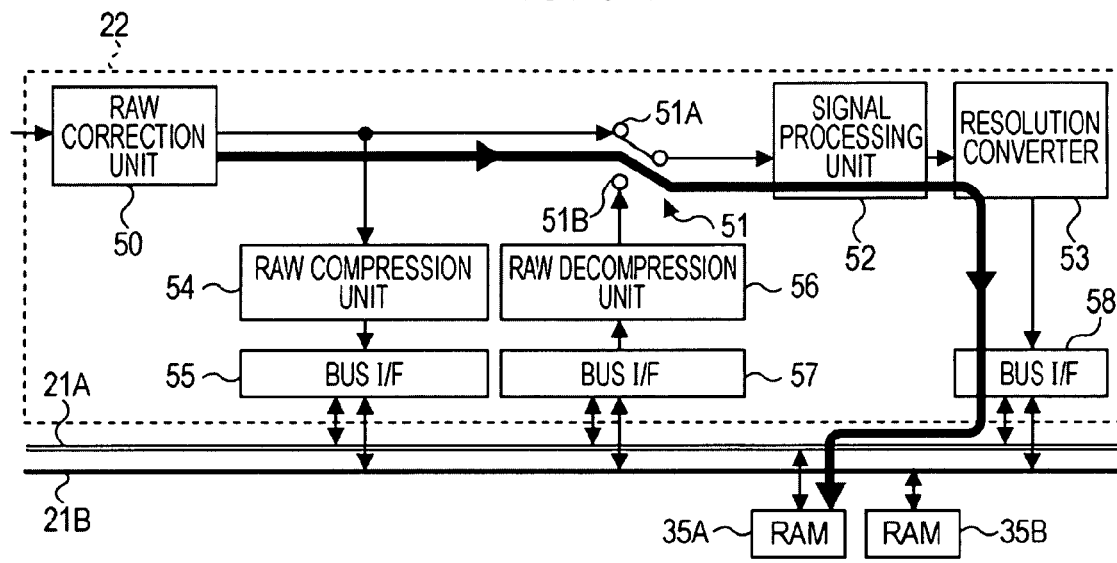
FIGS. 9A to 9C are schematic diagrams illustrating examples of data paths of different operation modes of the camera-signal processing unit according to the second embodiment.
Figure 9B:
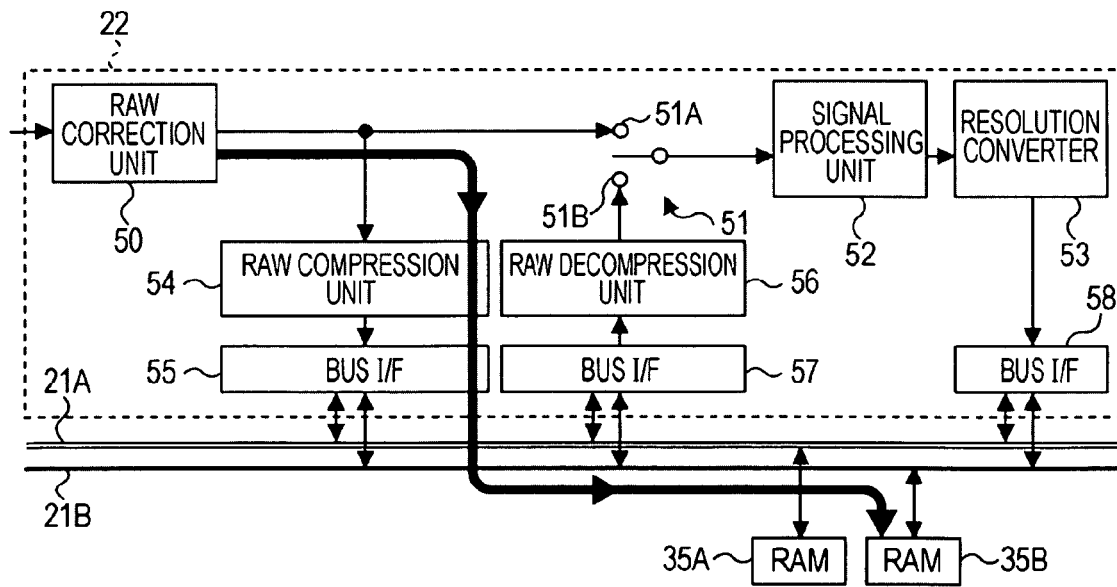
Figure 9C:
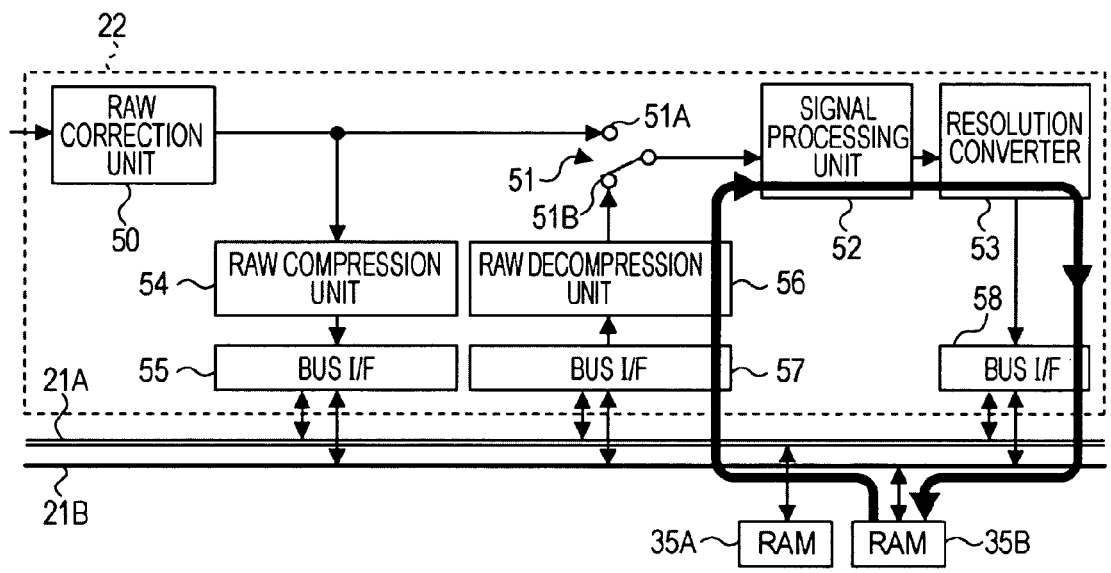

FIGS. 9A to 9C are schematic diagrams illustrating examples of data paths of different operation modes of the camera-signal processing unit 22 according to the second embodiment. Note that, the memory controllers 34A and 34B are omitted in FIGS. 9A to 9C.

FIG. 9A shows an example of a data path in the moving-image data recording mode. In the second embodiment, in the moving-image data recording mode, RAW data output from a RAW correction unit 50 is supplied through a selected terminal 51A of a switch unit 51 to a signal processing unit 52 and a resolution converter 53 in accordance with a transmission request A supplied from the signal processing unit 52 as indicated by a heavy line in FIG. 9A. The bus I/F 58 outputs a transmission request C to the resolution converter 53 in accordance with a state of the bus 21A. In accordance with the transmission request C, the resolution converter 53 outputs data to the bus I/F 58. The data is transmitted from the bus I/F 58 to the bus 21A and written to the RAM 35A. The data written to the RAM 35A is supplied through the bus 21A to the moving-image codec unit 26 and the display controller 27 in a later stage.

FIGS. 9B and 9C are examples of a data path in the still-image data recording mode. Specifically, FIG. 9B is an example of a data path when an image pickup signal is read. In this case, as indicated by a heavy line in FIG. 9B, the bus I/F 55 supplies a transmission request B to the RAW correction unit 50 in accordance with a state of the bus 21B. In response to the transmission request B supplied from the bus I/F 55, the RAW correction unit 50 outputs RAW data to the RAW compression unit 54 where the RAW data is subjected to encoding and compressing processing, and thereafter the RAW data is supplied to the bus I/F 55. The compressed RAW data is supplied from the bus I/F 55 to the bus 21B, and written to the RAM 35B.

FIG. 9C shows an example of a data path used when signal processing is performed on the compressed RAW data which is written in the RAM 35B. The compressed RAW data is read from the RAM 35B in a predetermined manner and is supplied through the bus 21B to the bus I/F 57. The bus I/F 58 outputs a transmission request C in accordance with a state of the bus 21B. The signal processing unit 52 outputs a transmission request A in response to the transmission request C supplied from the bus I/F 58.

The transmission request A is supplied through a terminal 51B of the switch unit 51 and the RAW decompression unit 56 to the bus I/F 57. The bus I/F 57 supplies the compressed RAW data to the RAW decompression unit 56 in response to the transmission request A. The compressed RAW data is decompressed using the RAW decompression unit 56 so as to be RAW data, and the RAW data is supplied through the switch unit 51 to the signal processing unit 52. The RAW data is subjected to signal processing using the signal processing unit 52 and the resolution converter 53 in a predetermined manner, is output from the resolution converter 53 in response to the transmission request C supplied from the bus I/F 58, and is supplied to the bus I/F 58. The RAW data is transmitted from the bus I/F 58 to the bus 21B and is written to the RAM 35B. The RAW data written to the RAM 35B is supplied through the bus 21B to the still-image codec unit 25 in a later stage.

As described above, an access to an external memory in the moving-image data recording mode and an access to an external memory in the still-image data recording mode may be selectively used by switching the data paths from one to another by selecting one of the buses 21A and 21B. Accordingly, the number of accesses to an external memory may be suppressed, and consequently, risk of buffer breakdown may be considerably reduced.

As with the first embodiment, the processing performed for the partial breakdown which is a type of the buffer breakdown may be similarly employed in the second embodiment. Specifically, as with the first embodiment, a read controller 61 included in a synchronous converter 503 in the RAW correction unit 50 determines whether a buffer is broken down, whether the buffer is fully broken down or partially broken down if the buffer is determined to be broken down, and whether the buffer is broken down in the moving-image data recording mode or in the still-image data recording mode also in the second embodiment. When it is determined that the buffer is broken down, a cause of the breakdown is stored in an internal register included in the read controller 61.

Note that in the foregoing first and second embodiments, in the camera-signal processing unit 22, for example, hardware is commonly used by the processing performed on moving-image data and the processing performed on still-image data. Therefore, the signal processing is performed on the still-image data in a time-sharing manner in a vertical blanking period or a horizontal blanking period of the moving-image data processing. Alternatively, the processing may be performed on the still-image data after the moving-image data is recorded in the recording medium 37.

When the configuration of the second embodiment is employed, the processing performed on still-image data may be easily realized by software processing performed using the CPU 30, or may be realized by a combination of the software processing performed using the CPU 30 and hardware including the signal processing unit 52 and the resolution converter 53.

For example, an image pickup signal is output from the image pickup element 11 every frame timing, and the image pickup signal is converted into RAW data using the F/E unit 12 and is supplied to the RAW correction unit 50 included in the camera-signal processing unit 22. In the moving-image data processing, the bus I/F 53 outputs a transmission request C in accordance with a state of the bus 21A and supplies the transmission request C to the resolution converter 53 and the signal processing unit 52. The signal processing unit 52 outputs a transmission request A in response to the transmission request C. In response to the transmission request A, the RAW correction unit 50 supplies the RAW data through the switch unit 51 to the signal processing unit 52 and the resolution converter 53. In response to the transmission request C, the resolution converter 53 supplies the RAW data through the bus I/F 58 to the bus 21A, and the RAW data is written to the RAM 35A.

In parallel to the moving-image data processing, the bus I/F 55 monitors a state of the bus 21B and outputs a transmission request B in accordance with the state of the bus 21B. In response to the transmission request B, the RAW correction unit 50 outputs the RAW data. The RAW data is subjected to the encoding and compressing processing using the RAW compression unit 54 and supplied to the bus I/F 55. The compressed RAW data is supplied from the bus I/F 55 to the bus 21B, and further written to the RAM 35B. The compressed RAW data written in the RAM 35B is read through the bus 21B using the CPU 30, is subjected to software processing such as decompressing processing and predetermined signal processing, and is again written to the RAM 35B through the bus 21B.

Thereafter, the RAW data which has been subjected to the signal processing is read from the RAM 35B, is supplied through the bus 21B to the still-image codec unit 25, for example, and subjected to the encoding and compressing processing in a predetermined manner. The still-image data which has been subjected to the encoding and compressing processing is supplied through the bus 21B to the recording/reproducing controller 36, and recorded in the recording medium 37. Alternatively, the still-image data which has been subjected to the encoding and compressing processing may be written to the RAM 35B again through the bus 21B, and thereafter, may be recorded in the recording medium 37.

As described above, since an access to an external memory in the moving-image data recording mode and an access to an external memory in the still-image data recording mode may be selectively used by switching the data paths from one to another by selecting one of the buses 21A and 21B, and software processing is employed as the still-image data processing, still-image data may be recorded while moving-image data is recorded as long as capacity of the RAM 35B and the capacity of the recording medium 37 have margins.

Furthermore, when the software processing performed using the CPU 30 is employed as the still-image data processing, part of the processing performed on still-image data using the CPU 30 may be replaced by processing performed using dedicated hardware connected to the bus 21B, for example.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus which performs processing on moving-image data in accordance with an image pickup signal output from an image pickup element in parallel to processing performed on still-image data in accordance with the image pickup signal, the image pickup apparatus comprising:
an image pickup unit configured to convert a ray into an electric signal by means of photoelectric conversion and output a resultant image pickup signal;
a buffer unit configured to temporarily store the image pickup signal output from the image pickup unit;

a buffer controller configured to control reading of data from the buffer unit;

a first signal processing unit configured to output a first transmission request, perform processing on the image pickup signal read from the buffer unit every frame timing in response to the first transmission request, and output moving-image data; and a second signal processing unit configured to output a second transmission request, perform processing on the image pickup signal read from the buffer unit in response to the second transmission request at a predetermined timing, and output still-image data, wherein the buffer controller determines whether it is possible that the image pickup signal is read from the buffer unit without deteriorating continuity on the basis of a data storage state of the buffer unit, the first transmission request, and the second transmission request.

2. The image pickup apparatus according to claim 1,
wherein priorities are set for two states, that is, a first state in which it is determined that it is not possible that the image pickup signal is read without deteriorating the continuity on the basis of the first transmission request and a second state in which the same determination is performed on the basis of the second transmission request, and when it is determined that it is not possible that the image pickup signal is read without deteriorating the continuity from the buffer unit, an operation corresponding to one of the first and second transmission requests which has a lower priority is stopped for a predetermined period.

3. The image pickup apparatus according to claim 2,
wherein the predetermined period is determined on the basis of the frame timing.

4. The image pickup apparatus according to claim 2, further comprising:
an external memory configured to temporarily store the moving-image data and the still-image data,
wherein the priorities are set in accordance with priorities for the moving-image data and the still-image data to be written to the external memory.

5. The image pickup apparatus according to claim 1,
wherein when it is determined that the buffer controller is not capable of reading the image pickup signal from the buffer unit without deteriorating the continuity on the basis of the first transmission request or the second transmission request, processing corresponding one of the first and second transmission requests which is a cause of a result of the determination is stopped for a predetermined period.

6. The image pickup apparatus according to claim 5,
wherein the predetermined period is determined on the basis of the frame timing.

7. The image pickup apparatus according to claim 1,
wherein the first and second transmission requests are transmitted in accordance with a state of and external memory which stores the moving-image data and the still image data and a state of a bus which is used to connect the first and second signal processing units to each other.

8. The image pickup apparatus according to claim 7,
wherein the moving-image data is written to the external memory without deteriorating the continuity.

9. The image pickup apparatus according to claim 7,
wherein the external memory and the bus are commonly used by processing of transmitting the moving-image data and processing of transmitting the still-image data.

10. The image pickup apparatus according to claim 7,
wherein the external memory—and the bus are provided for each of the moving-image data and the still-image data.

11. The image pickup apparatus according to claim 7,
wherein the first signal processing unit receives the still-image data read from the external memory through the bus.

12. The image pickup apparatus according to claim 1,
wherein when processing performed on the moving-image data using the first signal processing unit and processing performed on the still-image data using the second signal processing unit are performed in parallel, the buffer controller determines that when the buffer unit is in a full state and at least one of the first and second transmission requests is not received, it is not possible that the image pickup signal is read from the buffer unit without deteriorating the continuity.

13. A control method for an image pickup apparatus which performs processing on moving-image data in accordance with an image pickup signal output from an image pickup element in parallel to processing performed on still-image data in accordance with the image pickup signal, the control method for the image pickup apparatus comprising the steps of:
converting a ray into an electric signal by means of photoelectric conversion and temporarily storing an image pickup signal output from an image pickup unit in a buffer unit;
controlling reading of data from the buffer unit;
outputting a first transmission request, performing processing on the image pickup signal read from the buffer unit every frame timing in response to the first transmission request, and outputting moving-image data; and
outputting a second transmission request, performing processing on the image pickup signal read from the buffer unit in response to the second transmission request at a predetermined timing, and outputting still-image data,
wherein in the buffer controlling step, it is determined whether it is possible that the image pickup signal is read from the buffer unit without deteriorating continuity on the basis of a data storage state of the buffer unit, the first transmission request, and the second transmission request.

14. A computer-readable medium storing a computer program for causing a computer to execute a control method for an image pickup apparatus which performs processing on moving-image data in accordance with an image pickup signal output from an image pickup element in parallel to processing performed on still-image data in accordance with the image pickup signal, said program comprising the steps of:
converting a ray into an electric signal by means of photoelectric conversion and temporarily storing an-image pickup signal output from an image pickup unit in a buffer unit;
controlling reading of data from the buffer unit;
outputting a first transmission request, performing processing on the image pickup signal read from the buffer unit every frame timing in response to the first transmission request, and outputting moving-image data; and
outputting a second transmission request, performing processing on the image pickup signal read from the buffer unit in response to the second transmission request at a predetermined timing, and outputting still-image data,
wherein in the buffer controlling step, it is determined whether it is possible that the image pickup signal is read from the buffer unit without deteriorating continuity on the basis of a data storage state of the buffer unit, the first transmission request, and the second transmission request.

15. A data processing apparatus comprising:
a buffer unit configured to temporarily store data input at a predetermined timing;
a buffer controller configured to control reading of the data from the buffer unit;
a first signal processing unit configured to output a first transmission request, perform first processing on the data read from the buffer unit every predetermined timing in response to the first transmission request, and output first data; and
a second signal processing unit configured to output a second transmission request, perform second processing on the data read from the buffer unit in response to the second transmission request, and' output second data, wherein the buffer controller determines whether it is possible that the data is read from the buffer unit without deteriorating continuity on the basis of a data storage state of the buffer unit, the first and second transmission requests.

16. The data processing apparatus according to claim 15, wherein priorities are set for two states, that is, a first state in which it is determined that it is not possible that the data is read without deteriorating the continuity on the basis of the first transmission request and a second state in which the same determination is ,performed on the basis of the second transmission request, and
when it is determined that it is not possible that the data is read without deteriorating the continuity from the buffer unit, an operation corresponding to one of the first and second transmission requests which has a lower priority is stopped for a predetermined period.

17. The data processing apparatus according to claim 16, wherein the predetermined period is determined on the basis of the frame timing.

18. The data processing apparatus according to claim 16, further comprising:
an external memory configured to temporarily store the first data and the second data,
wherein the priorities are set in accordance with priorities for the first data and the second data to be written to the external memory.

19. The data processing apparatus according to claim 15, wherein when it is determined that the buffer controller is not capable of reading the data from the buffer unit without deteriorating the continuity on the basis of the first transmission request or the second transmission request, processing corresponding one of the first and second transmission requests which is a cause of a result of the determination is stopped for a predetermined period.

20. The data processing apparatus according to claim 19, wherein the predetermined period is determined on the basis of the frame timing.

21. The data processing apparatus according to claim 15, wherein the first and second transmission requests are transmitted in accordance with a state of and external memory which stores the first data and the second data and a state of a bus which is used to connect the first and second signal processing units to each other.

22. The data processing apparatus according to claim 21, wherein the first data is written to the external memory without deteriorating the continuity.

23. The data processing apparatus according to claim 21, wherein the external memory and the bus are commonly used by processing of transmitting the first data and processing of transmitting the second data.

24. The data processing apparatus according to claim 21, wherein the external memory and the bus are provided for each of the first data and the second data.

25. The data processing apparatus according to claim 15, wherein when processing performed on the first data using the first data processing unit and processing performed on the second data using the second data processing unit are performed in parallel, the buffer controller determines that when the buffer unit is in a full state and at least one of the first and second transmission requests is not received, it is not possible that the data is read from the buffer unit without deteriorating the continuity.

26. A data processing method comprising the steps of:
controlling reading of data from a buffer unit which temporarily stores data supplied at a predetermined timing;
outputting a first transmission request, performing first processing on the data read from the buffer unit every predetermined timing in response to the first transmission request, and outputting first data; and
outputting a second transmission request, performing second processing on the data read from the buffer unit in response to the second transmission request, and outputting second data,
wherein in the buffer controlling step, it is determined whether it is possible that the data is read from the buffer unit without deteriorating continuity on the basis of a data storage state of the buffer unit, the first transmission request, and the second transmission request.

27. A computer-readable medium storing a computer program for causing a computer to execute a data processing method, said program comprising the steps of:
controlling reading of data from a buffer unit which temporarily stores data supplied at a predetermined timing;
outputting a first transmission request, performing first processing on the data read from the buffer unit every predetermined timing in response to the first transmission request, and outputting first data; and
outputting a second transmission request, performing second processing on the data read from the buffer unit in response to the second transmission request, and outputting second data,
wherein in the buffer controlling step, it is determined whether it is possible that the data is read from the buffer unit without deteriorating continuity on the basis of a data storage state of the buffer unit and the first and second transmission requests.

* * * * *